US010308833B2

(12) United States Patent
Shen et al.

(10) Patent No.: US 10,308,833 B2
(45) Date of Patent: *Jun. 4, 2019

(54) CURABLE POLYURETHANE COATING COMPOSITION AND METHOD OF PREPARING THE SAME

(71) Applicant: Dow Global Technologies LLC, Midland, MI (US)

(72) Inventors: Yue Shen, Shanghai (CN); Fu Zhan, Shanghai (CN); Yan Wu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/035,634

(22) PCT Filed: Nov. 27, 2013

(86) PCT No.: PCT/CN2013/087893
§ 371 (c)(1),
(2) Date: May 10, 2016

(87) PCT Pub. No.: WO2015/077927
PCT Pub. Date: Jun. 4, 2015

(65) Prior Publication Data
US 2016/0272845 A1    Sep. 22, 2016

(51) Int. Cl.
C08G 18/64    (2006.01)
C08G 18/76    (2006.01)
C08G 65/42    (2006.01)
C09D 175/04    (2006.01)
C09D 175/08    (2006.01)

(52) U.S. Cl.
CPC ....... *C09D 175/08* (2013.01); *C08G 18/6407* (2013.01); *C08G 18/7664* (2013.01); *C08G 65/42* (2013.01); *C09D 175/04* (2013.01)

(58) Field of Classification Search
CPC ............. C09D 175/08; C09D 175/04; C08G 18/6407; C08G 18/7664; C08G 65/42
See application file for complete search history.

(56) References Cited

U.S. PATENT DOCUMENTS

| | | | |
|---|---|---|---|
| 4,292,214 A | 9/1981 | Blount | |
| 4,315,840 A * | 2/1982 | Kempter | C08G 18/0814 204/501 |
| 6,051,623 A | 4/2000 | Stielau | |
| 7,289,295 B2 | 10/2007 | Guan et al. | |
| 8,062,468 B2 | 11/2011 | Finter et al. | |
| 8,071,217 B2 | 12/2011 | Kramer et al. | |
| 8,202,920 B2 | 6/2012 | Kramer et al. | |
| 10,023,763 B2 * | 7/2018 | Watkins | C09D 163/00 |
| 2004/0198941 A1 * | 10/2004 | Schwarte | C08G 18/10 528/45 |
| 2005/0192423 A1 | 9/2005 | Niesten et al. | |
| 2008/0139685 A1 | 6/2008 | Reese et al. | |
| 2009/0264558 A1 | 10/2009 | Kramer et al. | |
| 2010/0087567 A1 | 4/2010 | Finter et al. | |
| 2010/0331454 A1 | 12/2010 | Fenn et al. | |
| 2011/0060101 A1 | 3/2011 | Suau et al. | |
| 2012/0207925 A1 | 8/2012 | Hornung et al. | |
| 2016/0167583 A1 | 9/2016 | Schrepfer | |

FOREIGN PATENT DOCUMENTS

| | | |
|---|---|---|
| JP | S4829530 | 9/1973 |
| JP | H01203414 A | 8/1989 |
| WO | 2013138994 A1 | 9/2013 |

OTHER PUBLICATIONS

International Preliminary Report on Patentability for International Application No. PCT/CN2013/087893; International Filing Date Nov. 27, 2013; dated May 31, 2016
International Search Report for International Application No. PCT/CN2013/087893; International Filing Date Nov. 27, 2013; dated Sep. 3, 2014; 3 pages.
Written Opinion of the International Searching Authority; International Application No. PCT/CN2013/087893; International Filing Date Nov. 27, 2013; dated Sep. 3, 2014; 5 pages.

* cited by examiner

*Primary Examiner* — Patrick D Niland
(74) *Attorney, Agent, or Firm* — Karl E. Stauss; Cantor Colburn LLP

(57) ABSTRACT

A curable coating composition having satisfactory low temperature curing property and fast drying speed while maintaining the flexibility and impact resistance of coating films, and also providing the coating films with good anti-corrosion property and good adhesion to a steel substrate; and a process of preparing the curable coating composition.

16 Claims, No Drawings

CURABLE POLYURETHANE COATING COMPOSITION AND METHOD OF PREPARING THE SAME

FIELD OF THE INVENTION

The present invention relates to a curable coating composition and a method of preparing the curable coating composition.

INTRODUCTION

Polyurethanes are one of the most important classes of thermosetting polymers widely used in marine and protective coatings (M&PC). Two-component polyurethane compositions are typically used as topcoats, but they are usually not suitable for use as primers due to their unsatisfactory anti-corrosion property and relatively high cost.

Coating compositions comprising bisphenol A epoxy resins and curing agents (for example, polyamide and phenalkamine) are widely used as primers for M&PC applications due to their better anti-corrosion property and lower cost than two-component polyurethane compositions. However, such epoxy coating compositions have disadvantages. Epoxy coating compositions comprising polyamide curing agents usually cure slowly or fail to cure at low temperature, for example, at lower than 5° C. This low curing temperature limitation may result in delayed production and/or defects in coating films such as cracking or detaching from a substrate when such coating compositions are applied under low temperature conditions. Phenalkamine curing agents are capable of curing epoxy resins at lower temperature and providing faster drying speed than polyamide curing agents can. Unfortunately, the combination of phenalkamine curing agents with epoxy resins usually compromises the flexibility of the resultant coating films. Flexibility is one of the key properties for coating films to resist cracking. In addition, epoxy primers usually have poorer compatibility with polyurethane topcoats than polyurethane primers.

Therefore, it is desirable to provide a curable coating composition that is suitable for primer applications and free from the challenges associated with conventional coating compositions. It is desirable that such coating composition provides low temperature curing property and has fast drying speed without compromising the flexibility of the resultant coating films. It is also desirable that such coating composition provides coating films with comparable or even better anti-corrosion property as compared to coating compositions comprising bisphenol A epoxy resins.

SUMMARY OF THE INVENTION

The present invention provides a novel curable polyurethane coating composition that combines an isocyanate-reactive component comprising a specific polyol with an isocyanate component comprising an isocyanate compound having at least two isocyanate functionalities. The specific polyol is the reaction product of a cashew nutshell liquid with an epoxy component at a molar ratio of epoxy-reactive groups to epoxy groups from 0.95:1 to 1.5:1. The low temperature curing property of the coating composition of the present invention is comparable to that of phenalkamine containing epoxy coating compositions, and is better than that of polyamide containing epoxy coating compositions, while maintaining the flexibility and impact resistance of the resultant coating films. The curable coating composition of the present invention has fast drying speed, for example, a tack-free time of 1.5 hours or less and a dry-hard time of 3.5 hours or less according to the test method described in the Examples section below. The coating composition of the present invention also provides coating films made therefrom with comparable or better anti-corrosion property than coating compositions based on bisphenol A epoxy resins.

In a first aspect, the present invention provides a curable coating composition comprising: an isocyanate-reactive component comprising a polyol, wherein the polyol is a reaction product of an epoxy component and an epoxy-reactive component at a molar ratio of epoxy-reactive groups of the epoxy-reactive component to epoxy groups of the epoxy component from 0.95:1 to 1.5:1, and wherein the epoxy-reactive component comprises a cashew nutshell liquid; and an isocyanate component comprising an isocyanate compound having at least two isocyanate functionalities.

In a second aspect, the present invention provides a method of preparing the curable coating composition of the first aspect. The method comprises admixing:

an isocyanate-reactive component comprising a polyol, wherein the polyol is a reaction product of an epoxy component and an epoxy-reactive component at a molar ratio of epoxy-reactive groups of the epoxy-reactive component to epoxy groups of the epoxy component from 0.95:1 to 1.5:1, and wherein the epoxy-reactive component comprises a cashew nutshell liquid; and an isocyanate component comprising an isocyanate compound having at least two isocyanate functionalities.

DETAILED DESCRIPTION OF THE INVENTION

The curable coating composition of the present invention comprises an isocyanate component and an isocyanate-reactive component.

The isocyanate-reactive component useful in the present invention comprises a polyol. The polyol useful in the present invention, a cashew nutshell liquid-modified polyol (hereinafter referred to as CME polyol), is a reaction product of a reaction mixture that comprises an epoxy component and an epoxy-reactive component that includes a cashew nutshell liquid (CNSL).

The epoxy-reactive component used to prepare the CME polyol may comprise at least 50 weight percent (wt %), at least 60 wt %, at least 70 wt %, at least 80 wt %, at least 90 wt %, or even 100 wt % of the CNSL, based on the total weight of the epoxy-reactive component. The CNSL is a by-product of cashew nut processing. The CNSL may be subjected to a heating process (for example, at the time of extraction from the cashew nut), a decarboxylation process, and/or a distillation process, such that the CNSL may include cardanol as a primary component and may additionally include cardol, methylcardol, and/or anacardic acid.

The CNSL useful in the present invention comprises cardanol. The concentration of cardanol in the CNSL may be, based on the total weight of the CNSL, at least 50 wt %, at least 70 wt %, at least 85 wt %, at least 90 wt %, or even 100 wt %.

The CNSL useful in the present invention may further comprise cardol. The concentration of cardol in the CNSL may be, based on the total weight of the CNSL, 0 wt % or more, 5 wt % or more, and at the same time, 50 wt % or less, 30 wt % or less, or even 15 wt % or less.

The CNSL useful in the present invention may be commercially available from Beijing Huada Saigao Co., Ltd. In some embodiments, the CNSL used in the present invention is a decarboxylated CNSL. The decarboxylated CNSL may be exposed to at least one distillation process.

In addition to the CNSL, the epoxy-reactive component used to prepare the CME polyol may also comprise phenols and/or phenol derivatives. Examples of suitable phenols and phenol derivatives include benzenediol, cresol, nonyl phenol, butyl phenol, dodecyl phenol, a naphthol based compound, a phenylphenol based compound, a hexachlorophene based compound, or mixtures thereof. When used, these phenols and phenol derivatives may be present in an amount of 40 wt % or less, 20 wt % or less, or even 10 wt % or less, based on the total weight of the epoxy-reactive component.

The epoxy component used to prepare the CME polyol may comprise one or more epoxy resins. The backbone of the epoxy resin may be saturated or unsaturated, aliphatic, cycloaliphatic, aromatic, or heterocyclic structure, or mixtures thereof. In some embodiments, the epoxy resin backbone is aromatic. The epoxy resin may be monomeric or polymeric. The epoxy resin may be based on reaction products of polyfunctional alcohols, phenols, cycloaliphatic carboxylic acids, aromatic amines or aminophenols with epichlorohydrin. Examples of suitable epoxy resins in the epoxy component include a bisphenol A diglycidyl ether; a bisphenol F diglycidyl ether; a resorcinol diglycidyl ether; triglycidyl ethers of para-aminophenols; reaction products of epichlorohydrin with o-cresol novolacs, hydrocarbon novolacs, phenol novolacs or mixtures thereof; or mixtures thereof. In some embodiments, one or more aromatic epoxy resins are used as the epoxy component. In these embodiments, the epoxy component may comprise at least 70 wt %, at least 80 wt %, at least 90 wt %, or even 100 wt % of the aromatic epoxy resins, based on the total weight of the epoxy component. In a preferred embodiment, a bisphenol A diglycidyl ether is used. The epoxy component used to prepare the CME polyol may include one or more epoxy resins that have at least two epoxy functionalities ("epoxide moieties per molecule"), from 2 to 10 epoxide functionalities, from 2 to 6 epoxy functionalities, or from 2 to 4 epoxy functionalities. In a preferred embodiment, the epoxy component comprises from 90 wt % to 100 wt % of one or more epoxy resins having at least two epoxy functionalities, based on the total weight of the epoxy component. The epoxy resin in the epoxy component may have an equivalent epoxy weight (EEW) from 80 to 1,000 grams per equivalent (g/eq), from 130 to 800 g/eq, or from 170 to 600 g/eq. EEW herein is measured according to the test method described in the Examples section below.

In some embodiments, the epoxy component used to prepare the CME polyol comprises a first epoxy resin having the following Formula (I):

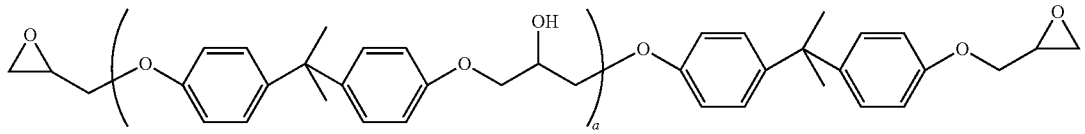

Formula (I)

wherein a is from 0 to 1.

The first epoxy resin useful in the present invention is generally a liquid epoxy resin. The term "liquid epoxy resin" herein refers to an epoxy resin in a liquid state without adding any solvent at room temperature (from 21 to 25° C.). The first epoxy resin may have an EEW of 170 g/eq or more, 180 g/eq or more, or even 190 g/eq or more, and at the same time, 260 g/eq or less, 250 g/eq or less, 220 g/eq or less, 210 g/eq or less, or even 195 g/eq or less. Suitable commercially available first epoxy resins include, for example, D.E.R.™ 331 (D.E.R. is a trademark of The Dow Chemical Company), D.E.R. 332, D.E.R. 330, and D.E.R. 383 epoxy resins, all available from The Dow Chemical Company, or mixtures thereof.

In some embodiments, the epoxy component used to prepare the CME polyol comprises a second epoxy resin having the following Formula (II):

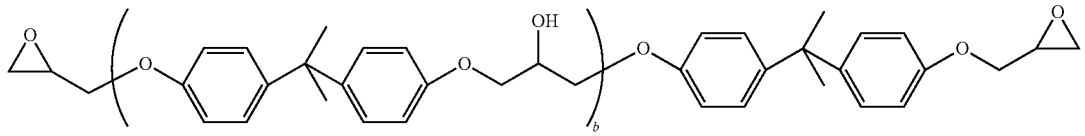

Formula (II)

wherein b is from 2 to 5, and preferably from 2 to 3.

The second epoxy resin useful in the present invention is generally a solid epoxy resin. The term "solid epoxy resin" herein refers to an epoxy resin in a solid state without adding any solvent at room temperature. The second epoxy resin may have an EEW of 350 g/eq or more, 400 g/eq or more, or even 450 g/eq or more, and at the same time, 750 g/eq or less, 600 g/eq or less, or even 550 g/eq or less. Suitable commercially available second epoxy resins include, for example, D.E.R. 671 epoxy resin available from The Dow Chemical Company.

In a preferred embodiment, the epoxy component used to prepare the CME polyol comprises a mixture of the first and the second epoxy resins. The concentration of the first epoxy resin, based on the total weight of the epoxy component, may be from 0 wt % to 100 wt %, or from 30 wt % to 70 wt %. The concentration of the second epoxy resin, based on the total weight of the epoxy component, may be from 0 wt % to 100 wt %, or from 30 wt % to 70 wt %.

In the reaction mixture used to prepare the CME polyol, the molar ratio of the epoxy-reactive groups of the epoxy-reactive component to the epoxy groups of the epoxy component is directly related to the performance of the coating compositions. The molar ratio the epoxy-reactive groups to the epoxy groups may be 0.95:1 or higher, 0.98:1 or higher, 0.99:1 or higher, or even 1:1, and at the same time, 1.5:1 or less, 1.2:1 or less, 1.1:1 or less, or even 1.05:1 or less. Surprisingly, the CME polyol made from the reaction mixture at the molar ratio described above can provide coating compositions with satisfactory drying properties and anti-corrosion performance.

The CME polyol useful in the present invention has an epoxy derived backbone and at least two secondary isocyanate-reactive groups, that is, secondary hydroxyl (OH) groups, for reacting with isocyanate groups in the isocyanate component. The epoxy backbone may act as a building block and determine the hydroxyl functionality and chemical structure of the CME polyol. In some embodiments, from 90 wt % to 100 wt % of the CME polyol has at least two hydroxyl groups per molecule, based on the weight of the CME polyol. In a preferred embodiment, the CME polyol comprises a mixture of a first CME polyol having no more than 3 hydroxyl groups per molecule and a second CME polyol having at least 4 hydroxyl groups per molecule, or even 5 or more hydroxyl groups per molecule, wherein synthesis of the CME polyol is carried out using a mixture of the first and second epoxy resins described above. Surprisingly, such CME polyol offers balanced properties of drying properties, flexibility, and impact resistance.

The epoxy-reactive groups provided by the CNSL may enable sufficient conversion of the epoxy component to the CME polyol. An epoxy group residue left in the CME polyol, may be no more than 1 wt %, less than 0.5 wt %, less than 0.1 wt %, or even less than 0.05 wt %, based on the weight of the CME polyol.

The CME polyol useful in the present invention may have an EEW of at least 5,000 g/eq, at least 10,000 g/eq, or even at least 50,000 g/eq or more, according to the test method described in the Examples section. The CME polyol may have a hydroxyl equivalent weight ("OHEW") of from 100 to 800 g/eq, from 200 to 600 g/eq, or from 300 to 500 g/eq. OHEW herein is calculated according to the test method described in the Examples section below.

Synthesis of the CME polyol useful in the present invention includes a ring opening reaction between the phenol group(s) of the CNSL and the epoxy groups of the epoxy component. For example, the CME polyol includes a cardanol linkage with the ring opened epoxy resin, which results in an ether bond between the opened epoxy resin and the cardanol.

In some embodiments, the CME polyol may comprise a compound having the following Formula (III), wherein synthesis of the CME polyol is carried out using an epoxy resin, which has two epoxide moieties and a resin backbone, and cardanol:

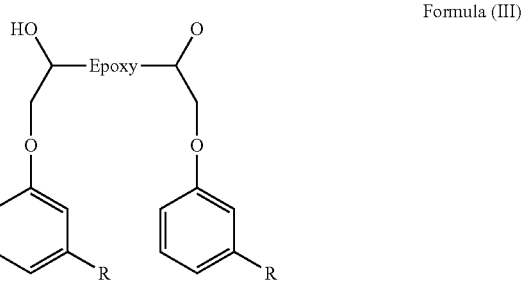

Formula (III)

wherein R is a straight-chain alkyl with 15 carbons containing 0 to 3 C=C bond(s) selected from $-C_{15}H_{31}$, $-C_{15}H_{29}$, $-C_{15}H_{27}$, and $-C_{15}H_{25}$. The CME polyol may be derived from a cardanol mixture that variously comprises cardanols having different R groups. The Epoxy in Formula (III) is the resin backbone.

In a preferred embodiment, the synthesis of the CME polyol using a bisphenol A diglycidyl ether and cardanol, includes the following reaction stage:

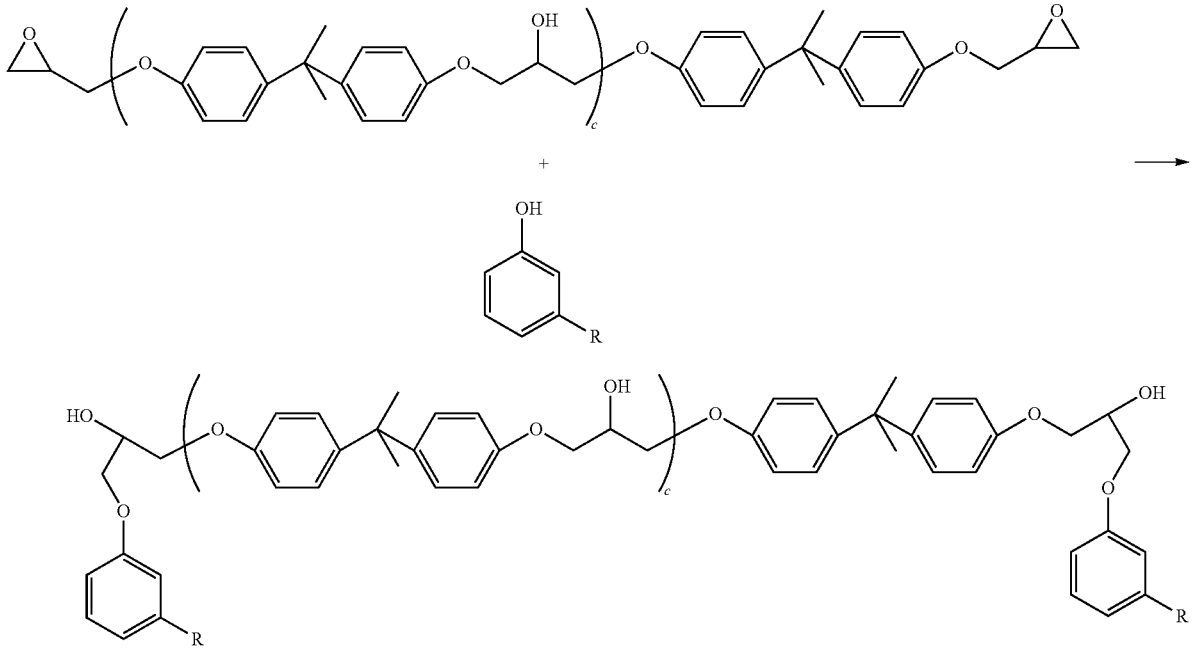

wherein c is from 0 to 5, and preferably from 0 to 3; and R is the same as previously defined in Formula (III).

Other examples of the CME polyol structures that are synthesized using various epoxy resins and cardanol include the following:

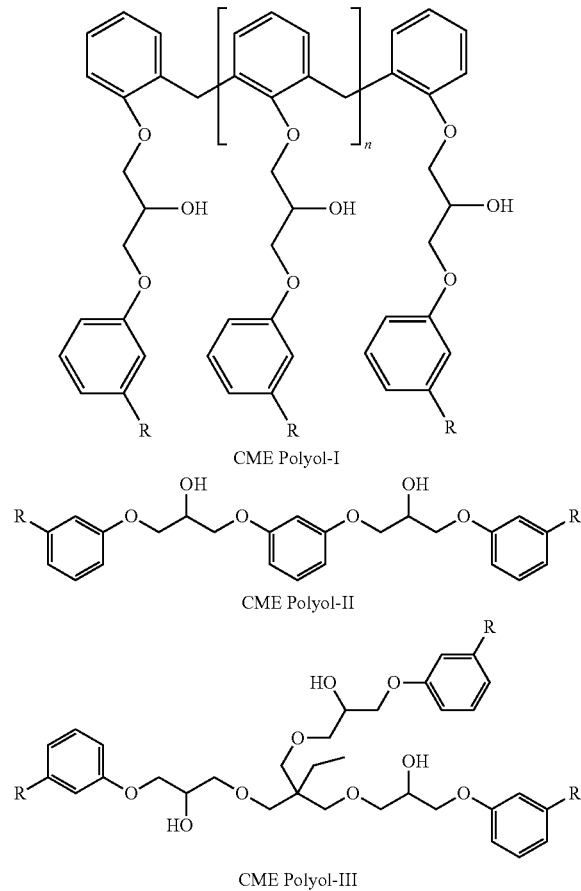

CME Polyol-I

CME Polyol-II

CME Polyol-III wherein n is from 0 to 3, and R in the above CME polyols is the same as previously defined in Formula (III).

The CME Polyol-I is synthesized using an aromatic polyepoxide based resin and cardanol. The CME Polyol-II is synthesized using a phenyl diepoxide resin and cardanol. The CME Polyol-III is synthesized using an aliphatic epoxy resin and cardanol.

The combined concentration of CME polyol in the isocyanate-reactive component may be 50 wt % or more, 60 wt % or more, 80 wt % or more, 90 wt % or more, or even 100 wt %, based on the total weight of the isocyanate-reactive component.

In preparing the CME polyol useful the present invention, the reaction between the epoxy-reactive component and the epoxy component can be conducted according to many known methods, for example, a modification reaction wherein the active hydrogen atom in the CNSL is reacted with epoxy groups of the epoxy component. The modification reaction described above may be conducted in the presence or absence of a solvent with the application of heating and mixing. Examples of suitable solvents include ketone (such as methyl isobutyl ketone and/or methyl amyl ketone), toluene, xylene, esters, or mixtures thereof. The reaction temperature may be from 20° C. to 260° C., from 80° C. to 200° C., or from 100° C. to 180° C. In general, the time for completion of the modification reaction may range from 5 minutes to 24 hours, from 30 minutes to 8 hours, or from 30 minutes to 4 hours. Preferably, a catalyst is added in the modification reaction. Examples of suitable catalysts for the modification reaction include basic inorganic reagents, phosphines, quaternary ammonium compounds, phosphonium compounds, and tertiary amines. Preferably, catalysts suitable for the modification reaction include sodium hydroxide (NaOH), potassium hydroxide (KOH), ethyl triphenyl phosphonium acetate, imidazole, or triethylamine The catalyst useful in the present invention may be used in an amount from 0.001 wt % to 3 wt %, from 0.01 wt % to 1.5 wt %, or from 0.05 wt % to 1.5 wt %, based on the total weight of the epoxy component.

The isocyanate-reactive component useful in the present invention may further comprise one or more additional polyols that are known in the coating art. The additional polyol may be a polyether polyol, a polyester polyol, an acrylic polyol, or mixtures thereof. The additional polyol may have a petroleum based building block (for example, polyacrylic, polyester, and/or polyether) or a natural oil (for example, castor oil) derived building block. The additional polyol may be present in an amount of from 0 wt % to 50 wt %, 25 wt % or less, or even 10 wt % or less, based on the total weight of the isocyanate-reactive component.

The curable coating composition of the present invention also comprises an isocyanate component. The isocyanate component comprises at least one isocyanate compound having at least two isocyanate functionalities. The isocyanate functionality of the isocyanate compound may be in the range of from 2 to 8, or from 2 to 6. Examples of suitable isocyanate compounds include diphenylmethane diisocyanate (MDI), higher functional homologs of MDI (commonly designated as "polymeric MDI"), toluene diisocyanate (TDI) such as 2,4-toluene diisocyanate and 2, 6-toluene diisocyanate, p-phenylene diisocyanate (PPDI), m-phenylene diisocyanate, naphthalene diisocyanate (NDI), isophorone diisocyanate (IPDI), hexamethylene diisocyanate (HDI), tris(p-isocyanatophenyl)methane, toluene-2,4,6-triisocyanate, 4,4'-dimethyldiphenylmethane-2,2', 5'5'-tetraisocyanate, isomers thereof, polymeric derivates thereof, or mixtures thereof. In some embodiments, aromatic isocyanate compounds are used. Preferred isocyanate compounds are 1) 4,4'-diphenylmethane diisocyanate and its isomers, polymeric derivatives thereof, or mixtures thereof; 2) TDI and polymeric derivatives thereof; or 3) mixtures of 1) and 2). The most preferred isocyanate compounds are 4,4'-diphenylmethane diisocyanate, isomers thereof, and polymeric MDI. Suitable commercially available isocyanate compounds include, for example, ISONATE™, PAPI™, and VORANATE™ isocyanate compounds all available from The Dow Chemical Company (ISONATE, PAPI, and VORANATE are trademarks of The Dow Chemical Company).

The molar ratio of a) total isocyanate-reactive groups of the isocyanate-reactive component to b) total isocyanate groups of the isocyanate component may be from 0.5:1 to 2:1, from 0.8:1 to 1.2:1, or from 0.9:1 to 1.1:1.

The curable coating composition of the present invention may comprise one or more pigments and/or extenders. Examples of suitable pigments and extenders include iron oxides, calcium carbonate, precipitated silica, magnesium carbonate, talc, zinc powder, zinc phosphate, titanium dioxide (TiO$_2$), carbon black, metallic materials including metalloid materials, feldspar powder, or mixtures thereof. Preferably, the curable coating composition comprises anticorrosive pigments such as zinc phosphate, zinc powder, or mixtures thereof. The combined concentration of the pigments and/or extenders in the curable coating composition may be, based on the total weight of the curable coating composition, 10 wt % or more, 20 wt % or more, or even 30 wt % or more, and at the same time, 90 wt % or less, 80 wt % or less, or even 70 wt % or less.

The curable coating composition of the present invention may have a pigment volume concentration (PVC) of 10% or more, 15% or more, or even 20% or more, and at the same time, 70% or less, 55% or less, 45% or less, or even 40% or less. PVC herein is calculated according to the method described in the Examples section below.

The curable coating composition of the present invention may further comprise one or more catalysts. Catalysts herein are those commonly used for the reaction of isocyanate groups with isocyanate-reactive groups to form polyurethanes. The catalysts may be located in the isocyanate component or in the isocyanate-reactive component. Examples of suitable catalysts include tertiary amines, Mannich bases formed from secondary amines, nitrogen-containing bases, alkali metal hydroxides, alkali phenolates, alkali metal alcoholates, hexahydrothiazines, organometallic compounds, or mixtures thereof. When present, the catalysts may be used in an amount from 0.0001 wt % to 4 wt %, from 0.001 wt % to 0.5 wt %, or from 0.01 wt % to 0.1 wt %, based on the total weight of the curable coating composition.

The curable coating composition of the present invention may also comprise one or more reactive diluents, non-reactive diluents, or mixtures thereof. The viscosity of the isocyanate component may be reduced by mixing diluents therewithin. Examples of suitable reactive diluents include polyethylene glycol, polypropylene glycol, or mixtures thereof. Examples of suitable non-reactive diluents include nonyl phenol, dodecyl phenol, or mixtures thereof. When present, the combined concentration of the reactive and non-reactive diluents may be from 0 wt % to 50 wt %, from 5 wt % to 30 wt %, or from 5 wt % to 20 wt %, based on the total weight of the curable coating composition.

The curable coating composition of the present invention may also comprise one or more solvents. Examples of suitable solvents include xylene, toluene, esters, mineral oil, naphthas, or mixtures thereof. When used, the solvent may be present in an amount of from 5 wt % to 60 wt %, or from 8 wt % to 30 wt %, based on the total weight of the curable coating composition.

In addition to the components described above, the curable coating composition of the present invention may further comprise any one or combination of the following additives: colorants, flowing agents, ultraviolet (UV) stabilizers, anti-oxidants, anti-foaming agents, plasticizers, leveling agents, dispersants, thixotropic agents, adhesion promoters, and grind vehicles. These additives may be present in a combined amount of from 0 wt % to 5 wt %, or from 1 wt % to 3 wt %, based on the total weight of the curable coating composition.

The curable coating composition of the present invention may be prepared using techniques known in the coating art. The curable coating composition can be prepared from the reaction mixture by admixing the isocyanate-reactive component with the isocyanate component. Other optional components may be added in its entirety or partially mixed with the isocyanate component and/or the isocyanate-reactive component. In some embodiments, a portion of the optional additive component is added to the isocyanate-reactive component before the reaction mixture is formed and another portion is separately added to the reaction mixture.

The curable coating composition of the present invention can be applied by incumbent means including brushing, dipping, rolling and spraying. The curable coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

Compared to coating compositions comprising epoxy resins and polyamide curing agents, the curable coating composition of the present invention has faster drying speed and better low temperature curing property without compromising the flexibility of the resultant coating films. The curable coating composition of the present invention also shows comparable low temperature curing property and provides coating films made therefrom with better flexibility and impact resistance as compared to compositions comprising epoxy resins and phenalkamine curing agents. The curable coating composition also provides the coating film with comparable or even better anti-corrosion property as compared to that of bisphenol A epoxy resin-based coating compositions. The curable coating composition can also provide good adhesion to a steel substrate, as evidenced by a pull-off adhesion strength of the resultant coating film to the steel much higher than 5 megapascals (MPa) according to the test method described in the Examples section below.

The curable coating composition of the present invention can be applied to, and adhered to, various substrates. Examples of substrates include wood, metals, plastic, foam, stone, elastomeric substrates, glass, concrete, or cementious substrates. The curable coating composition of the present invention is suitable for various coating applications, such as marine and protective coatings, automotive coatings, wood coatings, coil coatings, plastic coatings, powder coatings, can coatings, and civil engineering coatings. The curable coating composition is particularly suitable for use as heavy duty anticorrosive primers. The curable coating composition can be used alone, or in combination with other coatings to form multi-layer coatings. For example, a multi-layer coating may comprise the curable coating composition of the present invention as a primer, a tie coat and, optionally, a topcoat.

EXAMPLES

The following examples illustrate embodiments of the present invention. All parts and percentages in the examples are by weight unless otherwise indicated. The following materials are used in the examples:

Cashew nutshell liquid ("CNSL"), available from Beijing Huada Saigao Co., Ltd., comprises about 95 wt % of cardanol, based on the total weight of the CNSL.

D.E.R. 331 epoxy resin is a diglycidyl ether of bisphenol A and has an EEW of 182-192 g/eq.

D.E.R. 383 epoxy resin is a diglycidyl ether of bisphenol A and has an EEW of 176-183 g/eq.

D.E.R. 671 epoxy resin is a diglycidyl ether of bisphenol A and has an EEW of 470-550 g/eq.

D.E.R. 671-X75 is a xylene solution of a diglycidyl ether of bisphenol A and has an EEW of 470-550 g/eq.

Ethyl triphenyl phosphonium acetate ("Catalyst A1") is used as a catalyst.

PAPI 27 polymeric MDI has an isocyanate functionality of 2.7.

D.E.R. 331, D.E.R. 383, D.E.R. 671, D.E.R. 671-X75, Catalyst A1, and PAPI 27 are all available from The Dow Chemical Company.

Dibutyltin dilaurate (DBTL), available from Aldrich, is used as a catalyst.

Xylene is a solvent available from Sinopharm Chemical Reagent Co., Ltd.

VERSAMID™ 115 hardener is a polyamide hardener and is available from Cognis Corporation.

CARDOLITE™ NC 541LV hardener is a phenalkamine hardener and is available from Cardolite Corporation.

BYK™ 300, available from BYK Chemical, is a polyether modified polysiloxane and is used as a leveling agent.

DISPERBYK™-163, available from BYK Chemical, is a high molecular segmented copolymer and is used as a wetting and dispersing additive.

BYK™ 066N, available from BYK Chemical, is a polysiloxane and is used as a defoamer.

CRAYVALLAC™ Ultra, available from CRAYVALLEY, is a polyamide wax and is used as a thixotropic agent.

$TiO_2$ is used as a pigment available from DuPont.

Talc is used as a pigment available from Shanghai Wanjiang Chemical Company.

Silica sand is used as a pigment available from Dongsheng Chemical.

The following standard analytical equipment and methods are used in the Examples.

Epoxide Equivalent Weight (EEW) Analysis

A standard titration method is used to determine percent epoxide in various epoxy resins. The titration method used is similar to the method described in Jay, R. R., "Direct Titration of Epoxy Compounds and Aziridines", Analytical Chemistry, 36, 3, 667-668 (March 1964). In the present adaptation of this method, the carefully weighed sample (sample weight ranges from 0.17-0.25 gram) was dissolved in dichloromethane (15 mililiter (mL)) followed by the addition of tetraethylammonium bromide solution in acetic acid (15 mL). The resultant solution treated with 3 drops of crystal violet indicator (0.1% wt/vol in acetic acid) was titrated with 0.1 N perchloric acid in acetic acid on a Metrohm 665 Dosimat titrator (Brinkmann). Titration of a blank consisting of dichloromethane (15 mL) and tetraethylammonium bromide solution in acetic acid (15 mL) provided correction for solvent background. Percent epoxide and EEW are calculated using the following equations:

% Epoxide=[(mL titrated sample)−(mL titrated blank)]×(0.4303)/(gram sample titrated)
EEW=43023/[% Epoxide]

Calculated OHEW of the CME Polyol

The OHEW value of the CME polyol is calculated according to the following equation:

OHEW=$(m_1+m_2)/(n_1+n_2)$, wherein $m_1$ is the mass of the epoxy component, gram; $m_2$ is the mass of the epoxy-reactive component, gram; m is the mole of hydroxyl groups in the epoxy component; and $n_2$ is the mole of epoxy-reactive groups in the epoxy-reactive component that theoretically react with epoxy groups of the epoxy component.

Pigment Volume Concentration ("PVC")

PVC of a paint is calculated as follows, $$PVC(\%) = \frac{\text{volume of pigment(s)} + \text{volume extender(s)}}{\text{total dry volume of paint}}.$$

Viscosity

The initial mixed viscosity of a coating composition is measured using a Brookfield viscometer (6# rotator, 750 revolutions per minute (rpm)) at 25° C. after Part A and Part B are thoroughly mixed for 2 minutes.

Pull-Off Adhesion Strength

A coating composition is coated on a sand blasted panel and cured at room temperature for 7 days. The obtained coating film has a thickness of 80-100 The pull-off adhesion strength of the film is measured according to the ISO 4624 method.

Conical Mandrel Flexibility Test

Conical mandrel flexibility is conducted according to the ASTM D 522 method. A coating composition to be evaluated is directly sprayed onto a Q panel and cured at room temperature for 7 days. The smaller the crack length, the better the flexibility of the coating film.

Salt-Spray Test

The salt-spray testing of coating compositions is conducted according to the ASTM B117 method.

For a Pigment-Containing Coating Composition:

the coating composition is coated on a sand blasted steel panel and cured at room temperature for 7 days. The obtained film has a thickness of 70-100 µm. The coated panel is then scribed through the film to expose bare steel with a horizontal line centered on the panel. The scribed panel is then placed into a salt spray box for 2,000 hours. Then, measurement of creepage from cut edge after 2000-hour salt spray exposure is conducted according to the ASTM B117/D 1654-92 method. The shorter the creepage, the better the anti-corrosion property.

For a Clear Coating Composition:

the clear coating composition is coated on a Q panel and cured at room temperature for 7 days. The obtained film has a thickness of 40-60 µm. The coated panel is then placed into a salt spray box for 200 hours. The degree of rusting on the coated panel after 200-hour salt spray exposure is then evaluated according to the ASTM D610-01 test method.

Drying Properties

A BYK drying recorder is used to record tack-free time and dry-hard time of a coating composition according to the ASTM D 5895 method. The coating composition to be evaluated is coated on a glass panel, and then the glass panel is put on to the BYK drying timer for drying at room temperature.

Low Temperature Curing Property

Low temperature curing properties of coating compositions are evaluated by the solvent double rub technique as follows:

The coating compositions are applied onto Q panels and immediately put into a fridge and cured at 0° C. for 4 days to form films with a thickness of 40-50 μm. A 200 grams (g) hammer is wrapped with cotton cloth. The cotton cloth is first saturated with methyl ethyl ketone (MEK) and then rubs across the films. A constant back and forth motion is used allowing only the weight of the hammer to apply the force to the coated panels. This motion is continued until the films are penetrated to expose bare metal. One back and forth movement is considered one MEK double rub. Finally, the number of MEK double rubs is recorded. The larger the number of the MEK double rubs, the better the low temperature curing property.

Impact Resistance

Impact resistance is conducted according to the ASTM 2794 method. A coating composition to be evaluated is directly sprayed onto a tinplate to form a coating film. The coating film has an average thickness of 40-50 μm.

Synthesis of Polyol-A

Two hundred and six four (264) g of D.E.R. 331 epoxy resin and 418 g of CNSL (molar ratio of OH groups of the CNSL/epoxy groups of the epoxy resin=1/1) were charged into a reactor with a mechanical stirrer and were heated to 90° C. 500 ppm Catalyst A1 was added into the reactor and the temperature was raised to 160° C. slowly. The reaction was stopped after about 5 hours. The obtained Polyol-A was a yellowish liquid.

Synthesis of Polyol-B

Four hundred (400) g of D.E.R. 671 epoxy resin and 231 g of CNSL (molar ratio of OH groups of the CNSL/epoxy groups of the epoxy resin=1/1) were charged into a reactor with a mechanical stirrer and were heated to 90° C. 500 ppm Catalyst A1 was added into the reactor and the temperature was raised to 160° C. slowly. The reaction was stopped after about 5 hours. The obtained Polyol-B was a yellowish resin.

Synthesis of Polyol-C

One hundred and eighty (180) g of D.E.R. 383 epoxy resin and 300 g of CNSL (molar ratio of OH groups of the CNSL/epoxy groups of the epoxy resin=1/1) were charged into a reactor with a mechanical stirrer and were heated to 90° C. 500 ppm Catalyst A1 was added into the reactor and the temperature was raised to 180° C. slowly. The reaction was stopped after about 7 hours. The Polyol-C was obtained.

Synthesis of Polyol-D-X70

Four hundred and seventy five (475) g of D.E.R. 671 epoxy resin and 300 g of CNSL (molar ratio of OH groups of the CNSL/epoxy groups of the epoxy resin=1/1) were charged into a reactor with a mechanical stirrer and were heated to 90° C. After D.E.R. 671 epoxy resin was dissolved, 500 ppm Catalyst A1 was added into the reactor and the temperature was raised to 180° C. slowly. The reaction was stopped after about 7 hours. Then, 270 g of xylene was added into the resultant reaction product to obtain the Polyol-D-X70.

Synthesis of Polyol-E

One hundred (100) g of Polyol-E were prepared by mixing 73.7 g of the Polyol-C and 26.3 g of the Polyol-D-X70.

Synthesis of Polyol-F

One hundred and eighty (180) g of D.E.R. 383 epoxy resin and 330 g of CNSL (molar ratio of OH groups of the CNSL/epoxy groups of the epoxy resin=1.1/1) were charged into a reactor with a mechanical stirrer and were heated to 90° C. 500 ppm Catalyst A1 was added into the reactor and the temperature was raised to 180° C. slowly. The reaction was stopped after about 9 hours to obtain the Polyol-F.

Synthesis of Polyol-G-X70

Four hundred and seventy five (475) g of D.E.R. 671 epoxy resin and 330 g of CNSL (molar ratio of OH groups of the CNSL/epoxy groups of the epoxy resin=1.1/1) were charged into a reactor with a mechanical stirrer and were heated to 90° C. After D.E.R. 671 epoxy resin was dissolved, 500 ppm Catalyst A1 was added into the reactor and the temperature was raised to 180° C. slowly. The reaction was stopped after about 9 hours. Then, 270 g of xylene was added to the resultant reaction product to obtain the Polyol-G-X70.

Properties of these polyols obtained above were shown in Table 1.

TABLE 1

|  | Polyol-A | Polyol-B | Polyol-C | Polyol-D-X70 | Polyol-F | Polyol-G-X70 |
| --- | --- | --- | --- | --- | --- | --- |
| Calculated OHEW (g/eq) | 456 | 368 | 476 | 536 | 510 | 589 |
| EEW (g/eq) | 14,517 | 15,404 | 12,800 | 25,700 | 18,888 | 21,542 |
| OH value* (mgKOH/g) | n.a. | n.a. | 123 | 112 | n.a. | n.a. |

*OH value is determined according to the ASTM D4274-11 method.

Examples (Exs) 1-6 and Comparative (Comp) Exs A-B Clear Coating Compositions

Polyurethane coating compositions of Exs 1-6 and epoxy coating compositions of Comp Exs A-B were prepared based on formulations described in Table 2.

The polyurethane coating compositions of Exs 1-6 were prepared as below. The specific polyol prepared above, PAPI 27, and xylene were mixed and stirred for about 10 minutes. Then, DBTL catalyst was added into the resultant mixture and was further stirred for 2 minutes to obtain the coating compositions of Exs 1-6, respectively.

The epoxy coating compositions of Comp Exs A-B were prepared as below. D.E.R. 671-X75 solution, a hardener (VERSAMID 115 or CARDOLITE NC 541LV), and xylene were mixed together and stirred for about 10 minutes to obtain the coating compositions of Comp Exs A-B.

TABLE 2

| | Coating compositions, gram | | | | | | | |
|---|---|---|---|---|---|---|---|---|
| | Ex 1 | Ex 2 | Ex 3 | Ex 4 | Ex 5 | Ex 6 | Comp Ex A | Comp Ex B |
| Polyol-A | 50.0 | | | | | | | |
| Polyol-B | | 35.0 | | | | | | |
| Polyol-C | | | 100 | | | | | |
| Polyol-D-X70 | | | | 100 | | | | |
| Polyol-F | | | | | 100 | | | |
| Polyol-G-X70 | | | | | | 100 | | |
| PAPI 27 | 14.4 | 12.5 | 27.92 | 23.67 | 26.27 | 22.75 | | |
| DBTL 1% xylene solution | 0.13 | 0.10 | 0.38 | 0.28 | 0.38 | 0.28 | | |
| D.E.R. 671-X75 | | | | | | | 50.0 | 50.0 |
| VERSAMID 115 | | | | | | | 14.6 | |
| CARDOLITE NC 541LV | | | | | | | | 10.0 |
| Xylene | 27.8 | 20.4 | 20 | | 20 | | 9.8 | 8.3 |

The coating compositions of Exs 1-2 and Comp Exs A-B were evaluated for low temperature curing properties according to the test method described above. As shown in Table 3, the coating film made from the coating composition of Ex 1 showed similar number of MEK double rubs as that of the film made from the phenalkamine containing epoxy coating composition (Comp Ex B) that is commonly used for low temperature curing application in the industry. In particular, the number of MEK double rubs on the film made from the coating composition of Ex 2 was as high as 70. In contrast, the coating film made from the polyamide containing epoxy coating composition (Comp Ex A) cracked after 4-day curing at 0° C. The results in Table 3 indicate that the polyurethane coating compositions of the present invention have comparable or even better low temperature curing properties than the epoxy coating composition of Comp Ex B and have better low temperature curing properties than the epoxy coating composition of Com Ex A.

TABLE 3

| | Ex 1 | Ex 2 | Comp Ex A | Comp Ex B |
|---|---|---|---|---|
| Number of MEK double rubs (curing at 0° C. for 4 days) | 20 | 70 | film cracked | 25 |

The coating compositions of Exs 1-2 and Comp Exs A-B were also evaluated for anti-corrosion properties according to the salt spray test described above for clear coating compositions. The degree of rusting on coated panels after 200-hour salt spray exposure was reported in Table 4. As shown in Table 4, the coating films made from the coating compositions of Exs 1-2 showed smaller rusted area (0.03% and 0.1%, respectively) and smaller rusted spots (a rust grade of 9-S and 8-G, respectively) than that of films made from the epoxy coating compositions of Comp Exs A-B after 200-hour salt spray exposure. The results in Table 4 indicate that the inventive polyurethane coating compositions have better anti-corrosion properties than the epoxy coating compositions of Comp Exs A-B.

TABLE 4

| | Ex 1 | Ex 2 | Comp Ex A | Comp Ex B |
|---|---|---|---|---|
| Rust grade | 9-S | 8-G | 6-G | 6-G |
| Percentage of surface rusted | 0.03% | 0.1% | 0.5% | 3% |

The coating compositions of Exs 1-2 and Comp Exs A-B were also evaluated for the ability of coating films made therefrom to resist cracking according to the conical flexibility test described above. The coating films had an average thickness of about 50 μm. As shown in Table 5, the films made from the coating compositions of Exs 1 and 2 showed no crack on the film surface or a crack length less than 1.5 centimeters (cm), respectively. In contrast, the film made from the epoxy coating composition of Comp Ex B showed a crack length more than 14 cm. The results in Table 5 indicate that the coating compositions of Exs 1-2 provide comparable flexibility as Comp Ex A and better flexibility than Comp Ex B.

TABLE 5

| | Ex 1 | Ex 2 | Comp Ex A | Comp Ex B |
|---|---|---|---|---|
| Crack length | No crack | <1.5 cm | No crack | >14 cm |

The coating compositions of Exs 1-2 and Comp Exs A-B were also evaluated for the impact resistance of coating films made therefrom according to the impact resistance test described above. The impact resistance properties of the coating films were reported in Table 6. Both direct and reverse impact strength of the coating films made from the coating composition of Ex 1 were much higher than those of the coating films made from the coating compositions of Comp Exs A-B. The impact resistance of cured films made from the coating composition of Ex 2 was comparable to that of Comp Ex A, and much better than that of Comp Ex B.

TABLE 6

| | Ex 1 | Ex 2 | Comp Ex A | Comp Ex B |
|---|---|---|---|---|
| Direct impact strength | 36.3 kg*cm (80 lbs*cm) | 27.2 kg*cm (60 lbs*cm) | 27.2 kg*cm (60 lbs*cm) | <9.1 kg*cm (20 lbs*cm) |
| Reverse impact strength | 36.3 kg*cm (80 lbs*cm) | 13.6 kg*cm (30 lbs*cm) | 13.6 kg*cm (30 lbs*cm) | <9.11 kg*cm (20 lbs*cm) |

Drying properties of the coating compositions of Exs 3-6 were evaluated according to the method described above and were reported in Table 7. As shown in Table 7, the tack-free time and dry-hard time of the coating compositions of Exs 3-6 were all short and acceptable to the M&PC industry. The coating films made from the coating composition of Exs 3-6 also showed short crack length sufficient to meet the requirements of the M&PC industry.

TABLE 7

| Properties | Ex 3 | Ex 4 | Ex 5 | Ex 6 |
|---|---|---|---|---|
| Tack-free time (hour) | 0.8 | 0.6 | 1.3 | 1.1 |
| Dry-hard time (hour) | 2.5 | 1.5 | 3.1 | 2 |
| Crack length (cm) | 0 | 5.2 | 0 | 3.7 |

Exs 7-8 Paints

Paints of Exs 7-8 were prepared by mixing Part A and Part B based on formulations described in Table 8. Part A was prepared by mixing all components in Part A using a high speed disperser. PAPI 27 and DBTL xylene solution were mixed to obtain Part B.

TABLE 8

| | | Paints, weight parts | |
|---|---|---|---|
| | Component | Ex 7 | Ex 8 |
| Part A | Polyol-C | 25.83 | |
| | Polyol-E | | 25.83 |
| | BYK 300 | 0.16 | 0.16 |
| | DISPERBYK 163 | 0.04 | 0.04 |
| | BYK 066N | 0.12 | 0.12 |
| | CRAYVALLAC Ultra | 0.78 | 0.80 |
| | TiO$_2$ | 2.35 | 2.41 |
| | Talc | 15.68 | 16.08 |
| | Silica Sand | 22.73 | 23.31 |
| | Xylene | 22.18 | 24.04 |
| Part B | PAPI 27 | 7.45 | 7.08 |
| | DBTL 1% xylene solution | 0.10 | 0.10 |
| Total | | 100 | 100 |

Properties of the paints of Exs 7-8 and the resultant coating films were evaluated according to the test method described above and were reported in Table 9.

The initial mixed viscosities of the paints of Exs 7 and 8 were 76 centipoises (cps) and 42 cps, respectively, which were low and acceptable for air spray or airless spray.

The paints were evaluated according to the salt spray test described above for pigment-containing coating compositions. The obtained coating films had a thickness of from 60-80 µm. As shown in Table 9, the film of Ex 7 showed a crack length of only 1.6 cm, and the film of Ex 8 showed no surface crack. It indicates that coating films made from the paints of the present invention have good flexibility to meet industry requirements.

In addition, the pull-off adhesion strength of these films was larger than 20 MPa and met the industry requirement (usually 5 MPa). It indicates that the coating composition of the present invention can provide good adhesion to the steel substrate.

As shown in Table 9, these films after 2,000-hour salt spray exposure showed no bubble or rusting on the unscribed surface area and short creepage, indicating good anti-corrosion properties of the paints of Exs 7-8. Moreover, the creepage of the film made from the paint of Ex 8 (2 mm) was even shorter than that of Ex 7 (3 mm), which indicates that Ex 8 has even better anti-corrosion property than Ex 7.

TABLE 9

| | Ex 7 | Ex 8 |
|---|---|---|
| Properties of paints | | |
| Initial mixed viscosity (cps) | 76 | 42 |
| Properties of films | | |
| Crack length (cm) | 1.6 | 0 |
| Pull-off adhesion strength (MPa) | 23.41 | 23.66 |
| Creepage (mm) (after 2,000-hour salt spray exposure) | 3 | 2 |
| Surface of unscribed area | No bubble or rusting point | No bubble or rusting point |

Synthesis of Comp Polyol-H Substantially the Same as Disclosed in US20100331454A1

One hundred and eighty (180) g of D.E.R. 383 epoxy resin and 240 g of CNSL (molar ratio of OH groups of the CNSL/epoxy groups of the epoxy resin=0.8/1) were charged into a reactor with a mechanical stirrer and were heated to 90° C. 500 ppm Catalyst A1 was added into the reactor and the temperature was raised to 160° C. slowly. The reaction was stopped after about 5 hours to obtain the Comp Polyol-H. Properties of the Comp Polyol-H were shown in Table 10.

Synthesis of Comp Polyol-I substantially the same as disclosed in US20100331454A1

One hundred and eighty (180) g of D.E.R. 383 epoxy resin and 150 g of CNSL (molar ratio of OH groups of the CNSL/epoxy groups of the epoxy resin=0.5/1) were charged into a reactor with a mechanical stirrer and were heated to 90° C. 500 ppm Catalyst A1 was added into the reactor and the temperature was raised to 160° C. slowly. The reaction was stopped after about 5 hours to obtain the Comp Polyol-I. Properties of the Comp Polyol-I were shown in Table 10.

Synthesis of Comp Polyol-J

One hundred and eighty (180) g of D.E.R. 383 epoxy resin and 480 g of CNSL (molar ratio of OH groups of the CNSL/epoxy groups of the epoxy resin=1.6/1) were charged into a reactor with a mechanical stirrer and were heated to 90° C. 500 ppm Catalyst A1 was added into the reactor and the temperature was raised to 160° C. slowly. The reaction was stopped after about 7 hours to obtain the Comp Polyol-J. Properties of the Comp Polyol-J were shown in Table 10.

TABLE 10

| | Comp Polyol-H | Comp Polyol-I | Comp Polyol-J |
|---|---|---|---|
| Calculated OHEW (g/eq) | 516 | 648 | 660 |
| EEW (g/eq) | 3,091 | 710 | 30,180 |

Ex 9 and Comp Exs C-E Paints

Paints of Ex 9 and Comp Exs C-E were prepared by mixing Part A and Part B based on formulations described in Table 11. All these paints had a PVC value of 35%, and a solids content of 75%.

TABLE 11

| | | Paints, weight parts | | | |
|---|---|---|---|---|---|
| | Component | Ex 9 | Comp Ex C | Comp Ex D | Comp Ex E |
| Part A | Polyol-C | 25.66 | | | |
| | Comp Polyol-H | | 26.15 | | |
| | Comp Polyol-I | | | 27.30 | |
| | Comp Polyol-J | | | | 35.56 |

TABLE 11-continued

| | | Paints, weight parts | | | |
|---|---|---|---|---|---|
| | Component | Ex 9 | Comp Ex C | Comp Ex D | Comp Ex E |
| | BYK 300 | 0.16 | 0.16 | 0.16 | 0.14 |
| | DISPERBYK 163 | 0.04 | 0.04 | 0.04 | 0.03 |
| | BYK 066N | 0.12 | 0.12 | 0.12 | 0.10 |
| | CRAYVALLAC Ultra | 0.80 | 0.80 | 0.80 | 0.69 |
| | TiO$_2$ | 2.41 | 2.41 | 2.41 | 2.09 |
| | Talc | 16.08 | 16.08 | 16.08 | 13.93 |
| | Silica Sand | 23.31 | 23.31 | 23.31 | 20.19 |
| | Xylene | 24.04 | 24.04 | 24.04 | 20.81 |
| Part B | PAPI 27 | 7.25 | 6.76 | 5.61 | 6.28 |
| | DBTL 1% xylene solution | 0.20 | 0.20 | 0.20 | 0.17 |

Drying properties of the above paints were evaluated according to the test method described above and were reported in Table 12. The paints were applied on a glass strip ten minutes after mixing Part A and Part B. As shown in Table 12, the paint comprising the Polyol-C showed much faster tack-free time and dry-hard time at room temperature than the paints of Comp Exs C-E comprising the Comp Polyol-E, the Comp Polyol-F, or the Comp Polyol-J, respectively.

TABLE 12

| | Ex 5 | Comp Ex C | Comp Ex D | Comp Ex E |
|---|---|---|---|---|
| Tack-free time (hour) | 0.8 | 2 | >12 | >12 |
| Dry-hard time (hour) | 2.5 | 9 | >12 | >12 |

What is claimed is:

1. A curable coating composition comprising:
an isocyanate-reactive component comprising a polyol, wherein the polyol is a reaction product of an epoxy component and an epoxy-reactive component at a molar ratio of epoxy-reactive groups of the epoxy-reactive component to epoxy groups of the epoxy component from 0.95:1 to 1.5:1,
wherein the polyol has an epoxide equivalent weight (EEW) of from 5,000 grams per equivalent to 50,000 grains per equivalent, and wherein the epoxy-reactive component comprises a cashew nutshell liquid; and
an isocyanate component comprising an isocyanate compound having at least two isocyanate functionalities wherein all the isocyanate functionalities are available.

2. The curable coating composition of claim 1 further comprising a pigment and/or an extender.

3. The curable coating composition of claim 2 having a pigment volume concentration of from 10% to 70%.

4. The curable coating composition of claim 1, wherein the cashew nutshell liquid comprises cardanol, cardol, or a mixture thereof.

5. The curable coating composition of claim 1, wherein the epoxy component comprises from 90 wt % to 100 wt % of an epoxy resin having at least two epoxy functionalities, based on the total weight of the epoxy component.

6. The curable coating composition of claim 1 wherein the polyol has an epoxy group content of no more than 1 wt %, based on the weight of the polyol.

7. The curable coating composition of claim 1, wherein from 90 wt % to 100 wt % of the polyol has at least two hydroxyl groups per molecule, based on the weight of the polyol.

8. The curable coating composition of claim 1, wherein the polyol is a mixture of a first polyol having no more than three hydroxyl groups per molecule and a second polyol having at least 4 hydroxyl groups per molecule.

9. The curable coating composition of claim 1, wherein the epoxy component comprises a diglycidyl ether of bisphenol A, a diglycidyl ether of bisphenol F, or a mixture thereof.

10. The curable coating composition of claim 1, wherein the molar ratio of a) total isocyanate-reactive groups of the isocyanate-reactive component to b) total isocyanate groups of the isocyanate component is from 0.5:1 to 2:1.

11. The curable coating composition of claim 1, wherein the molar ratio of the epoxy-reactive groups of the epoxy-reactive component to the epoxy groups of the epoxy component is from 0.95:1 to 1.1:1.

12. The curable coating composition of claim 1, further comprising a catalyst, a solvent, a reactive diluent, a non-reactive diluent, or mixtures thereof.

13. A method of preparing the curable coating composition of claim 1, comprising admixing:
an isocyanate-reactive component comprising a polyol, wherein the polyol is a reaction product of an epoxy component and an epoxy-reactive component at a molar ratio of epoxy-reactive groups of the epoxy-reactive component to epoxy groups of the epoxy component from 0.95:1 to 1.5:1, and wherein the epoxy-reactive component comprises a cashew nutshell liquid; and
an isocyanate component comprising an isocyanate compound having at least two isocyanate functionalities.

14. The curable coating composition of claim 1, wherein polyol has a hydroxyl equivalent weight of from 100 to 800 gram per equivalent.

15. The curable coating composition of claim 1, wherein the polyol has an epoxy derived backbone and at least two secondary isocyanate-reactive groups.

16. The curable coating composition of claim 1, wherein the epoxy component comprises a diglycidyl ether of bisphenol A and the epoxy-reactive component comprises cardanol.

* * * * *